United States Patent
Helgerson et al.

(10) Patent No.: US 12,292,219 B2
(45) Date of Patent: May 6, 2025

(54) REFRIGERANT CIRCUIT COMPRESSOR GAS BEARING FEED

(71) Applicant: TRANE INTERNATIONAL INC., Davidson, NC (US)

(72) Inventors: Jacob T. Helgerson, La Crosse, WI (US); Jay H. Johnson, Houston, MN (US); Robert S. Bakkestuen, West Salem, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 200 days.

(21) Appl. No.: 17/929,268

(22) Filed: Sep. 1, 2022

(65) Prior Publication Data
US 2024/0077239 A1  Mar. 7, 2024

(51) Int. Cl.
*F25B 49/02* (2006.01)
*F04D 29/05* (2006.01)
(Continued)

(52) U.S. Cl.
CPC .......... *F25B 49/022* (2013.01); *F04D 29/057* (2013.01); *F16C 32/0603* (2013.01);
(Continued)

(58) Field of Classification Search
CPC ...... F25B 31/00; F25B 31/002; F25B 49/022; F25B 2600/02; F25B 2600/0251;
(Continued)

(56) References Cited

U.S. PATENT DOCUMENTS 5,088,292 A * 2/1992 Champagne .......... F25B 31/002
62/84
6,564,560 B2   5/2003 Butterworth et al.
(Continued)

FOREIGN PATENT DOCUMENTS

CN   213066639 U   4/2021
CN   114198925 A   3/2022
(Continued)

OTHER PUBLICATIONS

Extended European Search Report, European Patent Application No. 23194912.4, Feb. 2, 2024 (5 pages).

*Primary Examiner* — Jerry-Daryl Fletcher
*Assistant Examiner* — Daniel C Comings
(74) *Attorney, Agent, or Firm* — HSML P.C.

(57) ABSTRACT

A method is described for operating a refrigerant circuit that includes a compressor with a driveshaft and one or more gas bearings for supporting the driveshaft. The method includes operating the refrigerant circuit in a first mode which includes supplying gaseous working fluid compressed by the compressor to the one or more gas bearings of the compressor, and the one or more gas bearings using the compressed gaseous working fluid to support the driveshaft. The method includes operating the refrigerant circuit in a second mode which includes supplying liquid working fluid to the one or more gas bearings of the compressor, and the one or more gas bearings using the liquid working fluid to support the driveshaft. A refrigerant circuit includes a compressor, a condenser, an expander, an evaporator, and a controller configured to selectively operate the refrigerant circuit in a least a first mode and a second mode.

20 Claims, 5 Drawing Sheets

(51) Int. Cl.
*F04D 29/057* (2006.01)
*F16C 32/06* (2006.01)
*F25B 31/00* (2006.01)

(52) U.S. Cl.
CPC .......... *F16C 32/0629* (2013.01); *F25B 31/00* (2013.01); *F25B 31/002* (2013.01); *F16C 2362/52* (2013.01)

(58) Field of Classification Search
CPC ............. F25B 2600/0253; F04D 25/05; F04D 25/056; F04D 25/057; F04D 29/05; F04D 29/056; F04D 29/057; F16C 17/026; F16C 17/028; F16C 17/045; F16C 17/047; F16C 32/06; F16C 32/0603; F16C 32/0629; F16C 32/0614; F16C 32/064; F16C 2362/52
See application file for complete search history.

(56) References Cited

U.S. PATENT DOCUMENTS

| | | | |
|---|---|---|---|
| 8,104,298 | B2 | 1/2012 | Sishtla |
| 10,047,976 | B2 | 8/2018 | Creamer |
| 10,458,686 | B2 | 10/2019 | Jandal et al. |
| 10,801,309 | B2 | 10/2020 | Cunningham |
| 2009/0220338 | A1 | 9/2009 | Ietka |
| 2019/0211834 | A1 | 7/2019 | Hasegawa et al. |
| 2019/0376556 | A1* | 12/2019 | Jeung ................... F25B 31/00 |

FOREIGN PATENT DOCUMENTS

| | | | | |
|---|---|---|---|---|
| CN | 114198944 A | | 3/2022 | |
| EP | 3745050 A1 | | 12/2020 | |
| WO | WO-2018052694 A1 * | | 3/2018 | ............. F04B 39/02 |

* cited by examiner

REFRIGERANT CIRCUIT COMPRESSOR GAS BEARING FEED

FIELD

This disclosure relates to refrigerant circuits that include a gas bearing. More specifically, this disclosure relates to refrigerant circuits that include a compressor with a gas bearing in a heating, ventilation, air conditioning, and refrigeration ("HVACR") systems.

BACKGROUND

HVACR systems are generally used to heat, cool, and/or ventilate an enclosed space (e.g., an interior space of a commercial building or a residential building, an interior space of a refrigerated transport unit, or the like). A HVACR system can include a refrigerant circuit that utilizes a working fluid for providing cooled or heated air to an area. The heat transfer circuit includes a compressor. The compressor includes a shaft that is rotated to compress the working fluid, and one or more bearings for supporting the rotating shaft within the compressor.

BRIEF SUMMARY

In an embodiment, a method is directed to operating a refrigerant circuit. The refrigerant circuit includes a compressor with a driveshaft and one or more gas bearings to support the driveshaft. The method includes operating the refrigerant circuit in a first mode and operating the refrigerant circuit in a second mode. Operating the refrigerant circuit in the first mode includes compressing, with the compressor, a working fluid in the refrigerant circuit, supplying a portion of the gaseous working fluid to the one or more gas bearings of the compressor, and supporting, with the one or more gas bearings, the driveshaft of the compressor using the compressed gaseous working fluid. Operating the compressor in the second mode includes compressing, with the compressor, the working fluid, supplying a liquid portion of the working fluid in the refrigerant circuit to the one or more gas bearings of the compressor, and supporting, with the one or more gas bearings, the driveshaft of the compressor using the liquid working fluid.

In an embodiment, the refrigerant circuit includes a pump. The operating of the refrigerant circuit in the second mode also includes suctioning and compressing the liquid portion of the working fluid, and supplying the liquid portion of the working fluid compressed by the pump to the one or more gas bearings of the compressor.

In an embodiment, the compressing, with the compressor, of the working fluid in the first mode includes preventing the compressor from operating above a gas maximum speed limit. The compressing, with the compressor, of the working fluid in the second modes includes preventing the compressor from operating above a liquid maximum speed limit. The liquid maximum speed limit is less than the gas maximum speed limit.

In an embodiment, the one or more gas bearings include an aerostatic gas bearing. The gaseous portion of the working fluid is a gaseous portion of the working fluid compressed by the compressor.

In an embodiment, the gas bearing is a hybrid gas bearing. The supplying of the gaseous portion of the working fluid to the one or more gas bearings of the compressor includes the hybrid gas compressing the gaseous portion of the working fluid.

In an embodiment, the operating of the refrigerant circuit in the first mode also includes determining a pressure differential of the one or more gas bearings, the pressure differential being a difference between an inlet pressure of the gaseous portion of the working fluid into the one or more gas bearings and an outlet pressure of the gaseous portion exiting the one or more gas bearings.

In an embodiment, the method also includes switching the refrigerant circuit between operating in the first mode and operating in the second mode based on the pressure differential of the one or more gas bearings.

In an embodiment, the method also includes switching the refrigerant circuit to operate in a different mode than the first mode, in response to the pressure differential of the one or more gas bearings being less than a predetermined pressure minimum.

In an embodiment, the different mode than the first mode is the second mode.

In an embodiment, the method also includes operating the refrigerant circuit in a third mode that is a different mode than the first mode. The operating of the refrigerant circuit in a third mode includes compressing, with the compressor, the working fluid in the refrigerant circuit, supplying a compressed gaseous portion of the working fluid from an auxiliary gas supply to the one or more gas bearings and supporting, with the one or more gas bearings, the driveshaft of the compressor using the compressed gaseous portion of the working fluid supplied from the auxiliary gas supply. The compressed gaseous portion of the working fluid from the auxiliary gas supply is at least one of stored and generated in the auxiliary gas supply.

In an embodiment, a refrigerant circuit in an HVACR system includes a compressor with a driveshaft, a compression mechanism coupled to the driveshaft, a motor to rotate the driveshaft causing the compression mechanism to compress a working fluid in the refrigerant circuit, and one or more gas bearings to support the driveshaft while the driveshaft rotates. The refrigerant circuit also includes a condenser to cool the working fluid compressed by the compressor, an expander to expand the working fluid, an evaporator to heat the working fluid with a process fluid, a main flow path traveling through the compressor, the condenser, the expander, and the evaporator, and back to the compressor, a pump fluidly connected to the one or more gas bearings of the compressor. The refrigerant circuit also includes a controller configured to selectively operate the refrigerant circuit in a least a first mode and a second mode. Operating the refrigerant circuit in the first mode includes supplying a gaseous portion of the working fluid to the one or more gas bearings of the compressor, and supporting, with the one or more gas bearings, the driveshaft of the compressor using the gaseous portion of the working fluid. Operating the refrigerant circuit in the second mode includes supplying, with the pump, a liquid portion of the working fluid to the one or more gas bearings of the compressor, and supporting, with the one or more gas bearings, the driveshaft of the compressor using the liquid portion of the working fluid.

In an embodiment, the controller is configured to prevent the compressor from operating above a gas maximum speed limit in the first mode and from operating above a liquid maximum speed limit in the second mode. The liquid maximum speed limit is less than the gas maximum speed limit.

In an embodiment, the pump is configured to supply the liquid portion of the working fluid in the second mode at a higher pressure than the gaseous portion of the working fluid is supplied to the one or more gas bearings in the first mode.

In an embodiment, the operating of the refrigerant circuit in the second mode includes the pump suctioning and compressing the liquid portion of the working fluid, and supplying the liquid portion of the supplying the liquid portion of the working fluid compressed by the pump to the one or more gas bearings of the compressor.

In an embodiment, the controller is configured to determine a pressure differential of the one or more gas bearings in the first mode. The pressure differential is a difference between an inlet pressure of the gaseous portion of the working fluid into the one or more gas bearings and an outlet pressure of the gaseous portion exiting the one or more gas bearings.

In an embodiment, the refrigerant circuit includes a first sensor for detecting the inlet pressure of the gaseous portion of the working fluid into the one or more gas bearings, and a second sensor to detect the outlet pressure of the gaseous portion exiting the one or more gas bearings. The controller is configured to determine the pressure differential of the bearing based on the inlet pressure detected via the first sensor and the outlet pressure detected via the second sensor.

In an embodiment, the controller is configured to switch the refrigerant circuit between operating in the first mode and operating in the second mode based on the pressure differential of the one or more gas bearings.

In an embodiment, the controller is configured to switch the refrigerant circuit to operate in a different mode than the first mode in response to the pressure differential of the one or more gas bearings being less than a predetermined pressure minimum.

In embodiment, the different mode than the first mode is the second mode.

In an embodiment, the refrigerant circuit also includes an auxiliary gas supply. The controller is configured to selectively operate the refrigerant circuit in at least the first mode, the second mode, and a third mode. The operating of the refrigerant circuit in a third mode includes supplying a compressed gaseous portion of the working fluid from an auxiliary gas supply to the one or more gas bearings, and supporting, with the one or more gas bearings, the driveshaft of the compressor using the compressed gaseous portion of the working fluid supplied from the auxiliary gas supply. The compressed gaseous portion of the working fluid supplied from the auxiliary gas supply is at least one of stored and generated in the auxiliary gas supply.

BRIEF DESCRIPTION OF THE DRAWINGS

Like reference numbers represent like parts throughout.

DETAILED DESCRIPTION

A heating, ventilation, air conditioning, and refrigeration ("HVACR") system is generally configured to heat and/or cool an enclosed space (e.g., an interior space of a commercial or residential building, an interior space of a refrigerated transport unit, or the like). The HVACR system includes a refrigerant circuit that includes a compressor and a working fluid (e.g., a refrigerant, a refrigerant mixture, or the like) that circulates through the refrigerant circuit. The working fluid is utilized to heat or cool a process fluid (e.g., air, water and/or glycol, or the like).

The compressor includes a driveshaft, a motor that when powered rotates the driveshaft to compress the working fluid, and gas bearing(s) that support the driveshaft while it rotates. A gas bearing can be an aerostatic type of gas bearing. An aerostatic gas bearing relies upon the incoming flow of compressed gas to maintain the levitation of the driveshaft. When not provided with compressed gas at an adequate pressure, an aerostatic bearing is unable to provide adequate support to the driveshaft (e.g., is unable to keep the driveshaft levitated). The aerostatic gas bearing without the adequate pressure compressed gas cannot maintain the layer of pressurized gas that prevents solid contact between the driveshaft and the aerostatic gas bearing. A gas bearing can be a hydrodynamic type of gas bearing. A hybrid gas bearing has one or more hydrodynamic features on the inner surface of the bearing and/or external surface of the driveshaft that rely upon the spinning of the driveshaft to maintain levitation of the driveshaft. The hybrid gas bearing is configured to utilize a feed of compressed gas when the speed of the driveshaft is not fast enough to form a layer of compressed gas that adequate supports the driveshaft (e.g., during startup of the compressor). The hybrid gas bearing is configured to use the feed of compressed gas to form the layer of compressed gas that can adequately support the driveshaft when the driveshaft is at a lower speed. When the rotation of the driveshaft is at a lower speed and adequate pressure compressed gas is not available, the hybrid gas bearing is unable to provide adequate support to the driveshaft, which can lead to solid contact between the driveshaft and the hybrid aerostatic gas bearing. This can lead to damage to the driveshaft and/or the gas bearing(s) due to the rotating driveshaft directly contacting the aerostatic/hydrodynamic gas bearing(s).

Embodiments described herein are directed to refrigerant circuits, HVACR systems, compressors for a refrigerant circuit that utilize compressed gas fed compressor gas bearing(s) and are able to supply compressed liquid to said gas bearing(s) when compressed gas at sufficient pressure is not available. The gas bearing(s) can utilize the compressed liquid to continue stable operation of the compressor for at least temporary operation and/or at lower capacity.

Figure 1:
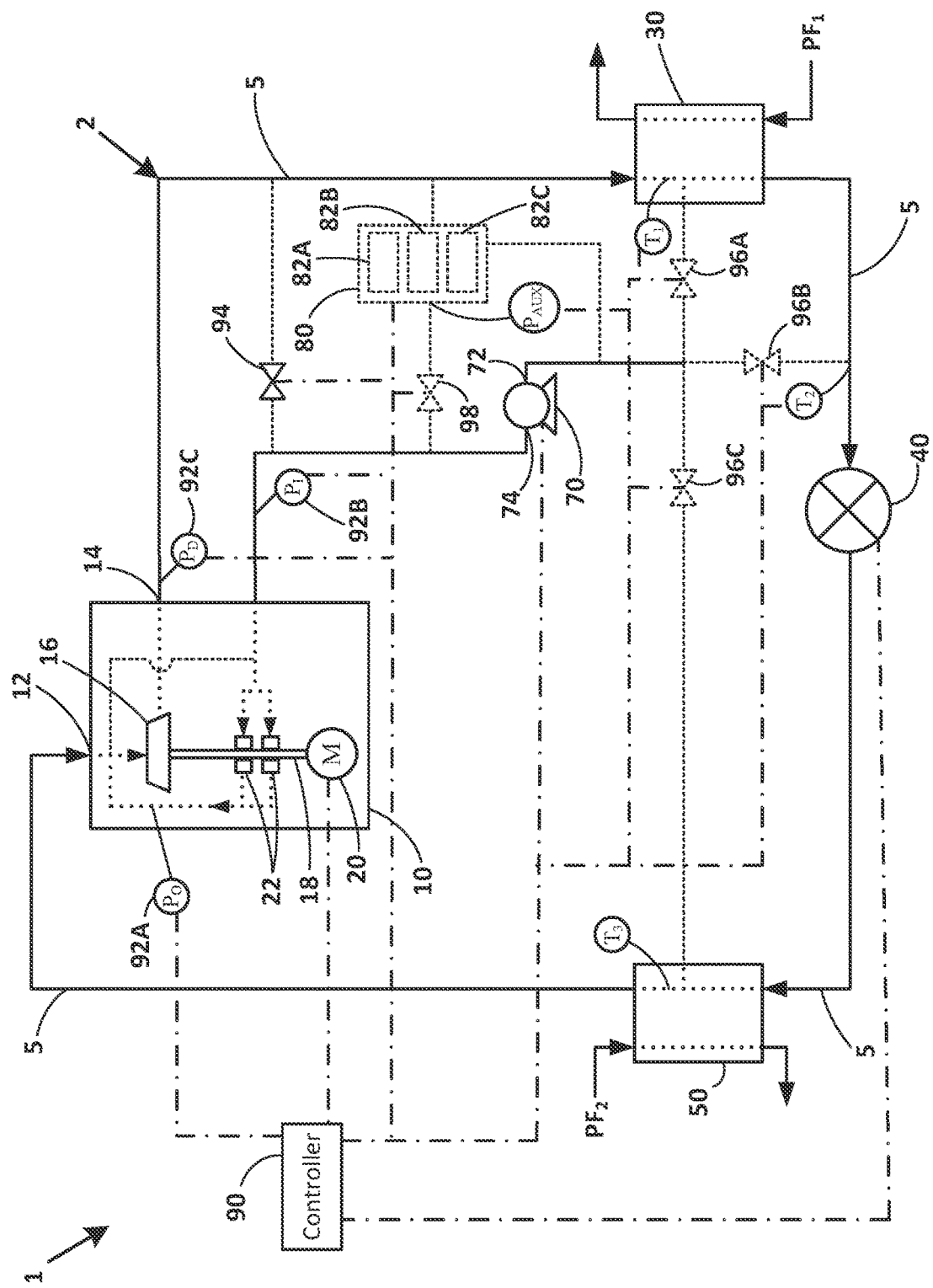
FIG. 1 is a schematic diagram of an embodiment of a refrigerant circuit of a heat heating, ventilation, air conditioning, and refrigeration system.

FIG. 1 is a schematic diagram of an embodiment of a refrigerant circuit 2 of an HVACR system 1. The refrigerant circuit 2 includes a compressor 10, a condenser 30, an expansion device 40, and an evaporator 50. In an embodiment, the refrigerant circuit 2 can be modified to include additional components, such as, for example, an economizer heat exchanger, one or more valve(s), sensor(s) (e.g., a flow sensor, a temperature sensor, and the like), a receiver tank, and the like.

The components of the refrigerant circuit 2 are fluidly connected. The refrigerant circuit 2 can be configured as a cooling system that can be operated in a cooling mode (e.g., a fluid chiller of an HVACR system, an air conditioning system, or the like), or the refrigerant circuit 2 may be configured as a heat pump system that can be run in a cooling mode or a heating mode.

A working fluid flows through the refrigerant circuit 2. The main flow path 5 of the working fluid through the refrigerant circuit 2 extends through the compressor 10, the condenser 30, the expansion device 40, the evaporator 50, and back to the compressor 10. In an embodiment, the main flow path 5 extends from a discharge outlet 14 of the compressor 10 back to a suction inlet 12 of the compressor 10, and through the compressor 10 from the suction inlet 12 to the discharge outlet 14. The working fluid in the main flow path 5 enters the compressor 10 through the suction inlet 12 and exits the compressor 10 through the discharge outlet 14. The working fluid includes one or more refrigerant(s).

Dotted lines are provided in the Figures to indicate fluid flows through some components (e.g., compressor 10, condenser 30, evaporator 50) for clarity, and should be understood as not specifying a specific route in each component. Dash-dotted lines are provided in FIG. 1 to illustrate electronic communications between different features. For example, a dashed dotted line extends from a controller 90 to an inlet pressure sensor 92A as the controller 90 receives measurements (e.g., pressure measurements) from the inlet pressure sensor 92A. For example, a dashed-dotted line extends from the controller 90 to the compressor 10 as the controller 10 controls the compressor 10 (e.g., speed of the compressor 10). For example, a dashed-dotted line extends from the controller 90 to valves 94, 96, 98 as the controller controls the opening/closing of the valves 94, 96, 98. For example, a dashed-dotted line extends from to pump 70 and auxiliary gas source 80 as the controller controls operation of the pump and operation of the auxiliary gas source 80. The dashed-dotted lines are omitted from FIGS. 2A-2C for illustrative/clarity purposes.

In an embodiment, the controller 90 includes memory (not shown) for storing information and a processor (not shown). The controller 90 in FIG. 1 and described below is described/shown as a single component. However, it should be appreciated that a "controller" as shown in FIGS. 1-2C and described herein may include multiple discrete or interconnected components that include a memory (not shown) and a processor (not shown) in an embodiment. In an embodiment, the controller 90 may be disposed within the compressor 10 (e.g., the controller 90 being an integral compressor controller). In an embodiment, the controller 90 may be the controller of the HVACR system 1.

Working fluid in a lower pressure gaseous state or mostly gaseous state is drawn into the suction inlet 12 of the compressor 10. The working fluid is compressed as it flows through the compressor 10. The working fluid flows from the discharge outlet 14 of the compressor 10 through the main flow path 5 to the condenser 30.

A first process fluid $PF_1$ flows through the condenser 30 separate from the working fluid. The condenser 30 is a heat exchanger that allows the working fluid and the first process fluid $PF_1$ to be in a heat transfer relationship without physically mixing as they each flow through the condenser 30. As the working fluid flows through the condenser 30, the working fluid is cooled by the first process fluid $PF_1$. Accordingly, the first process fluid $PF_1$ is heated by the working fluid and exits the condenser 30 at a higher temperature relative to temperature at which it entered the condenser 30. In an embodiment, the first process fluid $PF_1$ may be air, water and/or glycol, or the like that is suitable for absorbing and transferring heat from the working fluid and the refrigerant circuit 2. For example, the first process fluid $PF_1$ may be ambient air circulated from an outside atmosphere, water to be heated as hot water, or any suitable fluid for transferring heat from the refrigerant circuit 2. The working fluid is cooled by the condenser 30 and becomes liquid or mostly liquid as it is cooled in the condenser 30.

The liquid/gaseous working fluid flows from the condenser 30 to the expansion device 40. The expansion device 40 allows the working fluid to expand. The expansion causes the working fluid to significantly decrease in temperature. An "expansion device" as described herein may also be referred to as an expander. In an embodiment, the expander 40 may be an expansion valve, expansion plate, expansion vessel, orifice, or the like, or other such types of expansion mechanisms. It should be appreciated that the expander 40 may be any type of expander used in the field for expanding a working fluid to cause the working fluid to decrease in temperature. The gaseous/liquid working fluid has a lower temperature after being expanded by the expansion device 40.

The lower temperature gaseous/liquid working fluid then flows from the expansion device 40 to and through the evaporator 50. A second process fluid $PF_2$ also flows through the evaporator 50 separately from the working fluid. The evaporator 50 is a heat exchanger that allows the working fluid and the second process fluid $PF_2$ to be in a heat transfer relationship within the evaporator 50 without physically mixing. As the working fluid and the second process fluid $PF_2$ flow through the evaporator 50, the working fluid absorbs heat from the second process fluid $PF_2$ which cools the second process fluid $PF_2$. Accordingly, the second process fluid $PF_2$ exits the evaporator 50 at a lower temperature than the temperature at which it entered the evaporator 50. The working fluid is gaseous or mostly gaseous as it exits the evaporator 50. The working fluid flows from the evaporator 50 to the suction inlet 12 of the compressor 10.

In an embodiment, the second process fluid $PF_2$ is air cooled by the HVACR system 1 and ventilated to the enclosed space to be conditioned. In an embodiment, the second process fluid $PF_2$ is an intermediate fluid (e.g., water and/or glycol, a chiller liquid, a heat transfer fluid, or the like), and the cooled second process fluid $PF_2$ may be utilized by the HVACR system 1 to cool air in or ventilated to the enclosed space to be conditioned.

The compressor 10 includes a compression mechanism 16, a driveshaft 18, a motor 20, and one or more gas bearing(s) 22. The compression mechanism 16 is mounted to the driveshaft 18. The motor 20 operates using known principles to rotate the driveshaft 16. The motor 20 rotates the driveshaft 116 which rotates and/or orbits the affixed compression mechanism 16 to compress the working fluid. The rotating driveshaft 18 is supported by the gas bearing(s) 22. In an embodiment, the compressor 10 may be one of, but is not limited to, a centrifugal compressor, a scroll compressor, a screw compressor, a rotary compressor, or the like. In an embodiment, the compressor 10 is a centrifugal compressor. For example, in a scroll compressor, the compression mechanism 16 can be a set of meshed scrolls that includes an orbiting/rotating scroll that is mounted to the driveshaft 18.

In an embodiment, the compressor 10 is a variable speed compressor in its motor 20 is a variable speed motor configured to operate at a plurality of speeds. The controller 90 is configured to control the speed of the motor 20. For example, the controller 90 can be configured to control the speed of the motor 20 by controlling/adjusting the electrical power/current supplied to the motor 20 or by controlling a variable frequency drive (VFD) of the motor 20. The speed of the compressor 10 as discussed herein refers to the speed of its motor 20.

The variable speed compressor 10 can have a plurality of speeds (e.g., a maximum speed, a minimum speed, and multiple speeds between the maximum and the minimum speed). The speed at which the compressor 10 operates as any given time may be determined based on a desired cooling/heating for the refrigerant circuit, a configuration/design of the compressor, the refrigerants being used, etc. The controller 90 can determine a target speed setting for the compressor 10 based on a cooling requirement for the HVACR system (e.g., amount of cooling for the HVACR to provide to the conditioned space). The cooling requirement may be determined by the controller 90 based on the current and target temperature(s) of the conditioned space or received by the controller (e.g., user input, from a different controller of the HVACR system, etc.). The speed control of the compressor 10 is discussed in more detail below.

The gas bearing(s) 22 include one or more gas bearing(s) that support the driveshaft 18 while it rotates. The gas bearing(s) 22 can include one or more radial gas bearing(s) that radially support the driveshaft 18 while it rotates, and/or one or more thrust gas bearing(s) that axially support the driveshaft 18 while it rotates. The gas bearing(s) 22 may be aerostatic gas bearing(s) and/or hybrid gas bearing(s). The supply of fluid to the gas bearing(s) 22 is discussed in more detail below.

In an embodiment, one or more of the gas bearing(s) 22 are aerostatic gas bearing(s). An aerostatic gas bearing is configured to provide support by utilizing an incoming flow of compressed gas. In an embodiment, an aerostatic gas bearing includes a porous surface layer that is configured to distribute the compressed gas between the surface of the gas bearing and the surface of the driveshaft 18 which forms a layer of compressed gas between the aerostatic gas bearing and the driveshaft 18 which supports the rotating driveshaft 18. For example, this configuration can be referred to as a porous gas bearing or a porous carbon gas bearing.

In an embodiment, one or more of the gas bearing(s) 22 are hybrid aerostatic gas bearing(s). A hybrid gas bearing has one or more hydrodynamic features on the inner surface of the bearing and/or external surface of the shaft (not shown) that forms gas into a layer of compressed gas between the aerostatic gas bearing and the driveshaft 18 which supports the rotating driveshaft 18. The hybrid gas bearing is configured to utilize a feed of compressed gas when the speed of the driveshaft 18 is not fast enough to form a layer of compressed gas that adequate supports the driveshaft 18 (e.g., during startup of the compressor 10). The hybrid gas bearing is configured to use the feed of compressed gas to form the layer of compressed gas that can adequately support the driveshaft 18. Examples of hybrid aerostatic gas bearing may include, but are not limited, an externally pressurized herringbone groove bearing, an externally pressurized fixed geometry bearing (e.g., tri-lobe bearing, a canted pad bearing), an externally pressurized tilt pad bearing, or the like.

The HVACR system 1 is configured to supply gaseous working fluid or liquid working fluid to the gas bearing(s) 22 based on current parameters of the refrigerant circuit 2. The refrigerant circuit 2 and HVACR system 1 include a plurality of modes for supplying fluid to the gas bearing(s) 22 of the compressor. The controller 90 monitors the pressure $P_I$ of the gaseous working fluid supplied to the gas bearing(s) 22 and the pressure $P_O$ of the gaseous working fluid discharging from the gas bearing(s) 22. The pressure $P_I$ of the working fluid supplied to the gas bearing(s) 22 can also be referred to as the "inlet pressure". The pressure $P_O$ of the working fluid discharging from the gas bearing(s) 22 can be referred to as the "outlet pressure" or "vent pressure" of the gas bearing(s) 22. The gas bearing(s) 22 may vent to the suction side of the compressor 10. Thus, the outlet pressure $P_O$ of the gas bearing(s) 22 may be equal to the suction pressure of the compressor 10 (e.g., the pressure at the suction inlet 12 of the compressor 10, the pressure at an inlet of the compression mechanism 18, or the like).

The controller 90 is configured to select the mode of the refrigerant circuit 2 for supplying fluid to the gas bearing(s) 22 based on the pressure differential of the gas bearing(s) 22. The pressure differential of the gas bearing(s) 22 is the difference between the inlet pressure $P_I$ and the outlet pressure $P_O$ of the gas bearing(s) (i.e., pressure differential $P_A$=inlet pressure $P_I$–outlet pressure $P_O$). $P_A$ is used to indicate pressure differential generically (i.e., regardless of the state of the working fluid being supplied to the gas bearing(s) 22). In an embodiment, the controller 90 is configured to select a mode for the based on the inlet pressure $P_I$ of the working fluid supplied to the gas bearing(s) 22. The controller 90 is configured to selectively operate the refrigerant circuit 2 in at least a first mode and a second mode. For example, the controller 90 can operate the refrigerant circuit in the second mode for a period of time (e.g., during a startup of the compressor 10) and then subsequently operate the refrigerant circuit 2 in the first mode (e.g., after the startup of the compressor 10, after the compressor 10 reaches a predetermined speed, or the like). For example, the controller 90 may be configured to operate the refrigerant circuit 2 in the first mode when the compressor 10 during normal operation and to operate the refrigerant circuit 2 in the second mode during a startup of the compressor 10 and/or during a sudden/emergency loss of sufficient compression in the compressor 10 (e.g., use the second mode during sudden/emergency loss of sufficiently pressurized gas being discharged from the compression mechanism 16).

The refrigerant circuit 2 includes a pump 70. The pump 70 includes an inlet 72 connected to the main flow path 5 and an outlet 74 connected to the gas bearing(s) 22. The pump 70 is fluidly connected to the gas bearing(s). The pump 70 is configured to pump liquid working fluid within the refrigerant circuit 2 into the bearing(s) 22. As one example, the pump 70 is an oil-free pump, but it will be appreciated that the pump 70 may operate using oil. In an embodiment, the refrigerant circuit 2 is oil-free (i.e., the working fluid does not contain oil) and the pump 70 is an oil-free pump. The pump 70 is configured to compress and supply compressed liquid working fluid from its outlet 74 (e.g., supply higher pressure liquid working fluid from its outlet 74). In an embodiment, the pump 70 may be a centrifugal pump. In an embodiment, the pump 70 may be a positive displacement pump. For example, the pump 70 may be a gear pump, screw pump, gerotor pump, lobe pump, rotary vane pump, diaphragm pump, or the like.

The pump 70 may suction/pump liquid working fluid from one or more locations within the refrigerant circuit 2. For example, the pump 70 may be configured to pump liquid for location(s) at which liquid working fluid accumulates within the refrigerant circuit 2. The liquid working fluid may be pumped from the condenser 30, from the evaporator 50, and/or from between the condenser 30 and the evaporator in the main flow path 5 of the refrigerant circuit (e.g., downstream of the condenser 30 and upstream of the evaporator 50 in the main flow path 5). For example, the inlet 72 of the pump 70 may be connected to the evaporator 50, the piping that connects the condenser 30 to the expander 40, and/or the condenser 30. In an embodiment, the pump 70 may pump from a liquid holding tank in the main flow path 5 or fluidly connected to the main flow path 5. FIG. 1 shows the pump 70 pumping from multiple locations within the refrigerant circuit 2 (e.g., inlet 72 of the pump 70 connected to multiple locations within the refrigerant circuit 2). In an embodiment, the pump 70 may be configured to pump liquid from a single location in the main flow path 5.

In an embodiment, the controller 90 may be configured to detect the temperature $T_1$, $T_2$, $T_3$ of the liquid working fluid at one or more locations in the refrigerant circuit 2 (e.g., using temperature sensors 92D, 92E, 92F). The controller 90 may be configured to control the liquid by-pass valve(s) 96A, 96B, 96C so that the pump 70 pumps the liquid working fluid at the lowest temperature in the one or more locations (e.g., pumps the liquid working fluid from the location that had the coldest liquid working fluid).

The refrigerant circuit 2 can also include one or more liquid by-pass valve(s) 96A, 96B, 96C for controlling flow of working fluid to the pump 70 (e.g., flow of working fluid to the inlet 72 of the pump 70). For example, the controller 90 closes the liquid by-pass valve(s) 96A, 96B, 96B when the pump 70 is not being used to prevent flow of working fluid to and through the non-active pump 70. The by-pass valve(s) 96A, 96B, 96B may also be used to control the location the pump 70 pumps from and/or flow through the liquid by-pass when the pump 70 is not operating. In an embodiment, the pump 70 may be a type that prevents leakage therethrough when not operating and the refrigerant circuit 2 may not include the liquid by-pass valve(s) 96A, 96B, 96B. Operation of the pump 70 is discussed in more detail below.

In an embodiment, the refrigerant circuit 2 can include an auxiliary gas source 80. The auxiliary gas source 80 configured to supply generated/stored compressed gaseous working fluid to the gas bearing(s) 22. The auxiliary gas source 80 operates when the compressor 10 is unable to supply compressed gaseous working fluid at or above a minimum pressure $P_{Min}$. For example, the auxiliary gas source 80 may be, but is not limited to, a storage container 82A, an auxiliary compressor 82B, and/or a vaporizer 82C. For example, the storage container 82A can be a container configured to store compressed gaseous working fluid from the compressor 10 during normal operation. For example, the auxiliary compressor 82B can be a smaller secondary compressor that is able to operate to compress gaseous working fluid in the refrigerant circuit to generate compressed gaseous working fluid. The vaporizer 82C is configured to heat and vaporize liquid refrigerant within a container (e.g., a sealed container) to generate the compressed gaseous working fluid. For example, the vaporizer 82C can include the container (not shown) and a heater (not shown) configured to heat liquid working fluid within the container. The heater heats and vaporizes liquid working fluid within the container into gaseous working fluid, the gaseous working fluid builds-up within the container generating the compressed gaseous working fluid. Operation of the auxiliary gas source 80 is discussed in more detail below.

Figure 2A:
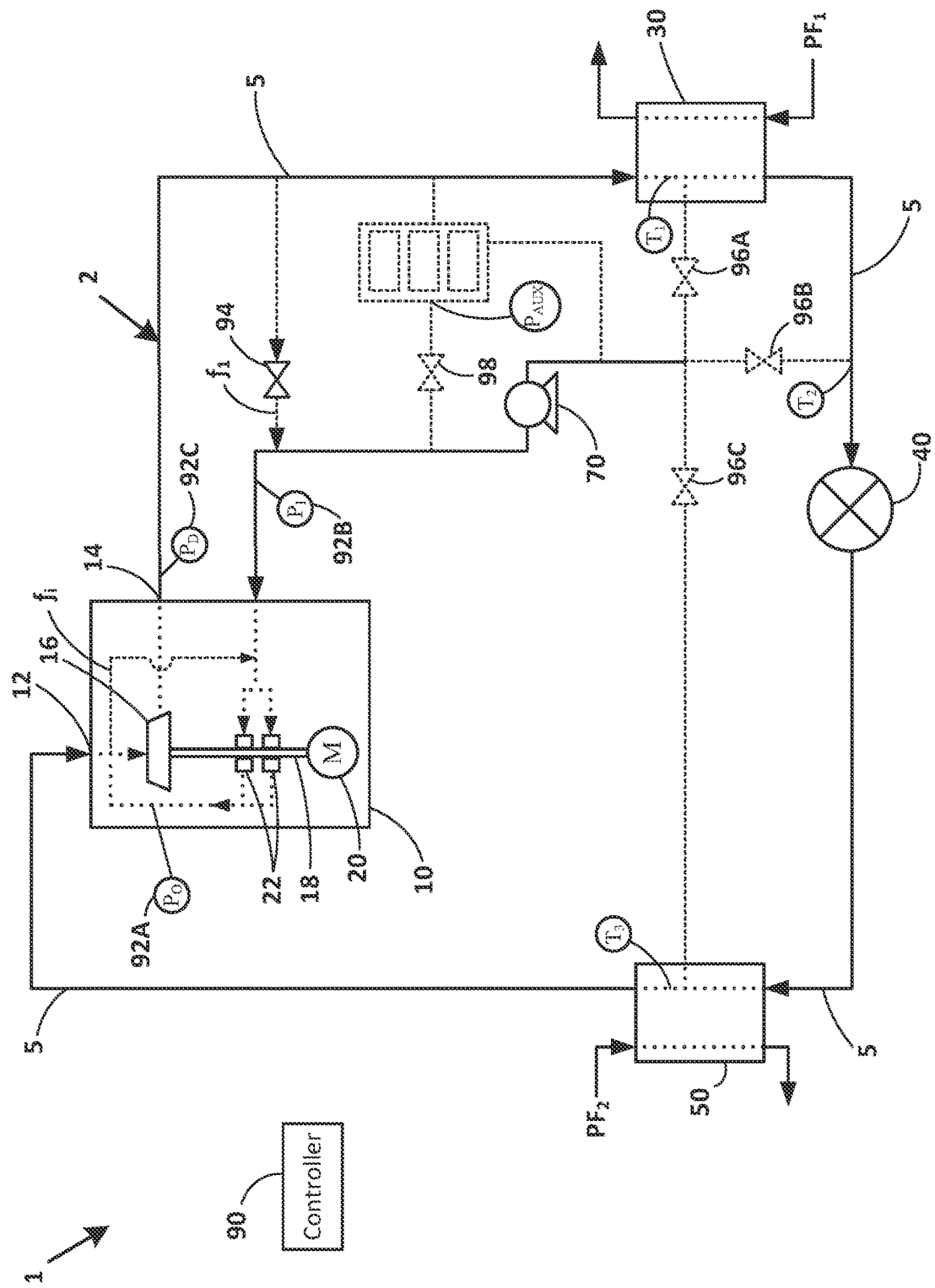
FIG. 2A is a schematic diagram of the refrigerant circuit in FIG. 1 operating in a first mode, according to an embodiment.

FIG. 2A shows the refrigerant circuit 2 operating in a first mode. The first mode can be referred to as a normal mode or a compressor gas supply mode.

In an embodiment, the gas bearing(s) include one or more aerostatic gas bearing(s). In the first mode, the refrigerant circuit 2 supplies a feed of the compressed working fluid $f_1$ to the gas bearing(s) 22. The compressed working fluid $f_1$ is a portion of the working fluid compressed by the compressor 10. The first mode can be referred to as a normal mode or a compressor gas supply mode. For example, a compressed gas bypass valve 94 is open, liquid bypass valve(s) 96A, 96B, 96C are closed, auxiliary gas supply valve 98 is closed, and the pump 70 is not operating such that a portion of the compressed working fluid discharged from the compression mechanism 16 of the compressor is directed to the gas bearing(s) 22. In an embodiment, the compressed gas bypass value 94 may be a throttle valve configured to regulate pressure and/or amount of the compressed working fluid $f_1$ supplied to the gas bearing 22 from the compressor 10 in the first mode. In FIG. 2A, the pathway for supplying the compressed working fluid $f_1$ to the gas bearing(s) 22 is shown external to the compressor 10. In another embodiment, the pathway for supplying the compressed gaseous working fluid $f_1$ may be internal to the compressor 10.

The refrigerant circuit is configured to operate in the first mode when the pressure differential $P_{AG}$ across the gas bearing(s) 22 using the compressed working fluid $f_1$ is at or greater than a predetermined pressure minimum $P_{Min}$ (i.e., $P_{AG} \geq P_{Min}$). $P_{AG}$ is used herein to indicate the pressure differential of the gas bearing(s) 22 when using the compressed gaseous working fluid $f_1$ that is compressed gaseous working fluid and supplied from the compression mechanism 16 of the compressor 10. The predetermined pressure minimum $P_{Min}$ can be based on the gas bearing(s) 22 providing adequate/stable support to the rotating driveshaft 18. For example, the predetermined minimum can be based on previous testing and/or modeling of similar compressors, gas bearing(s), and/or working fluids. During normal operation of the compressor 10, the pressure of the working fluid discharged from the compression mechanism 16 results in the pressure differential $P_{AG}$ across the gas bearing(s) 22 being at least the predetermined pressure minimum $P_{min}$.

In an embodiment, the gas bearing(s) 22 include/are hybrid gas bearing(s). In the first mode, the gaseous working fluid within the compressor 10 is suctioned and compressed by the hybrid gas bearing(s). For example, the gaseous working fluid suctioned and compressed by the hybrid gas bearing(s) is a portion of the inlet gaseous working fluid f to be compressed by the compression mechanism 16 (e.g., a portion of the gaseous working fluid flowing from the suction inlet 12 to the compression mechanism 16). For example, liquid bypass valve(s) 96A, 96B, 96C are closed, auxiliary gas supply valve 98 is closed, and the pump 70 is not operating such that no externally compressed fluid $f_2$, $f_3$ is supplied to the hybrid gas bearing(s).

In an embodiment, the refrigerant circuit 2 can configured to operate in the first mode when the speed of the compressor is at or greater than a predetermined bearing speed minimum. The predetermined bearing speed minimum can be based on the hybrid gas bearing(s) providing adequate/stable support to the rotating driveshaft 18. For example, the predetermined minimum can be based on previous testing and/or modeling of similar compressors, hybrid gas bearing(s), and/or working fluids. During normal operation of the compressor 10, the driveshaft 18 rotates at sufficient speeds for the hybrid gas bearing(s) to provide adequate support for the driveshaft 18 while it rotates.

In the first mode, the compressor 10 operates at or below a gas maximum speed limit. In the first mode, the controller 90 is configured to prevent the compressor 10 from operating at or above the gas maximum speed limit. In an embodiment, the gas maximum speed limit is a predetermined maximum speed for the compressor 10 to operate using the compressed gaseous working fluid $f_1$ in the gas bearing(s) 22. For example, the gas maximum speed limit is based on the gas bearing(s) 22 providing stable support of the driveshaft 10 using the compressed gaseous working fluid $f_1$. In an embodiment, the gas maximum speed limit is a predetermined maximum speed for the compressor 10 in which the driveshaft 18 rotates at a sufficient speed for the hybrid gas bearing(s) to provide adequate support for the driveshaft 18. The controller 90 is configured to prevent the compressor 10 from operating at or above the gas maximum speed limit in the first mode. For example, the controller 90 operates the compressor 10 at the gas maximum speed limit when a target speed for the compressor 10 is above the gas maximum speed limit. In an embodiment, the gas maximum speed limit is at or greater than 30,000 rpm. In an embodiment, the gas maximum speed limit is at or greater than 40,000 rpm. In an embodiment, the gas maximum speed limit is at or greater than 45,000 rpm.

Figure 2B:
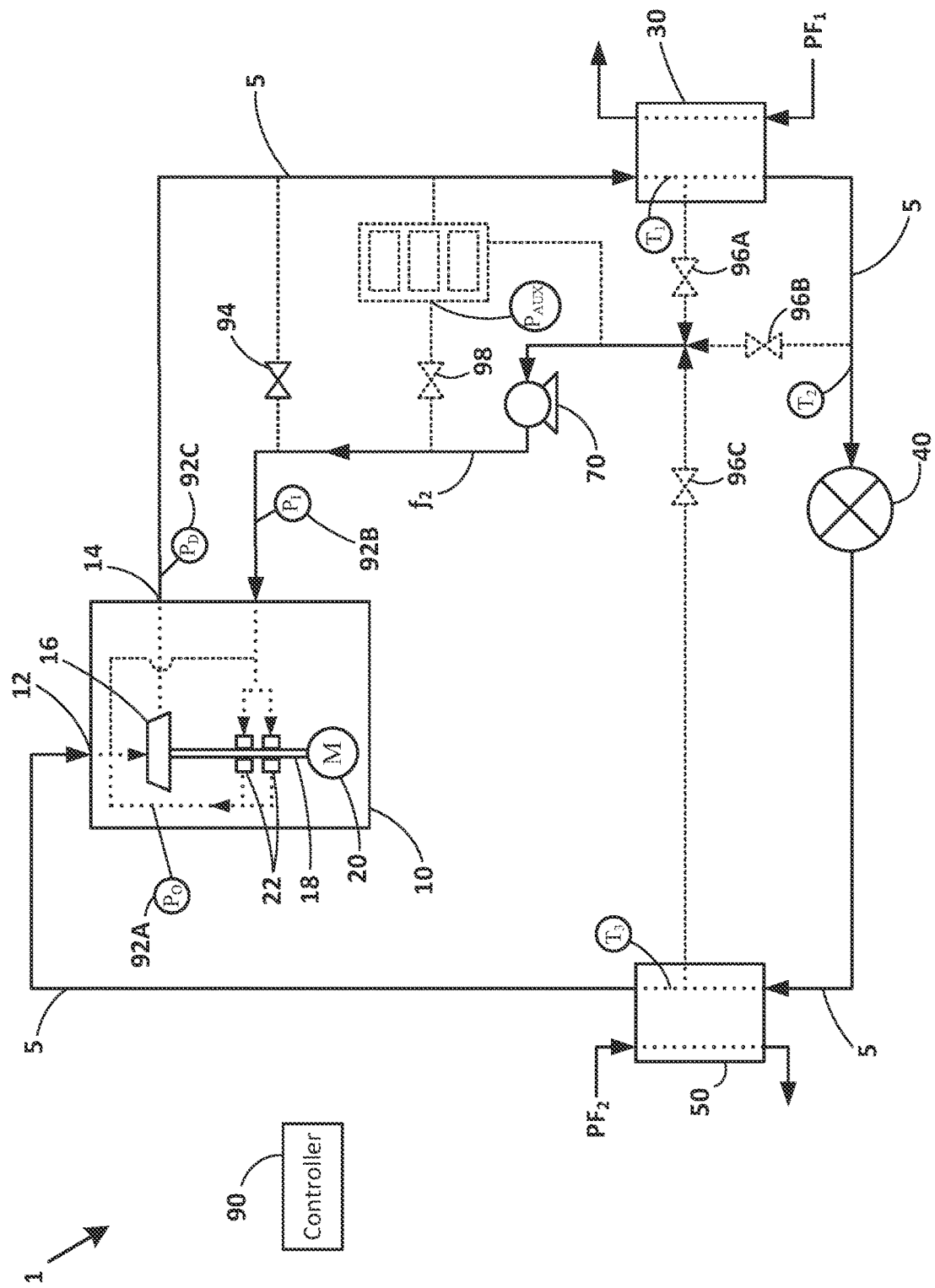
FIG. 2B is a schematic diagram of the refrigerant circuit in FIG. 1 operating in a second mode, according to an embodiment.
Figure 2C:
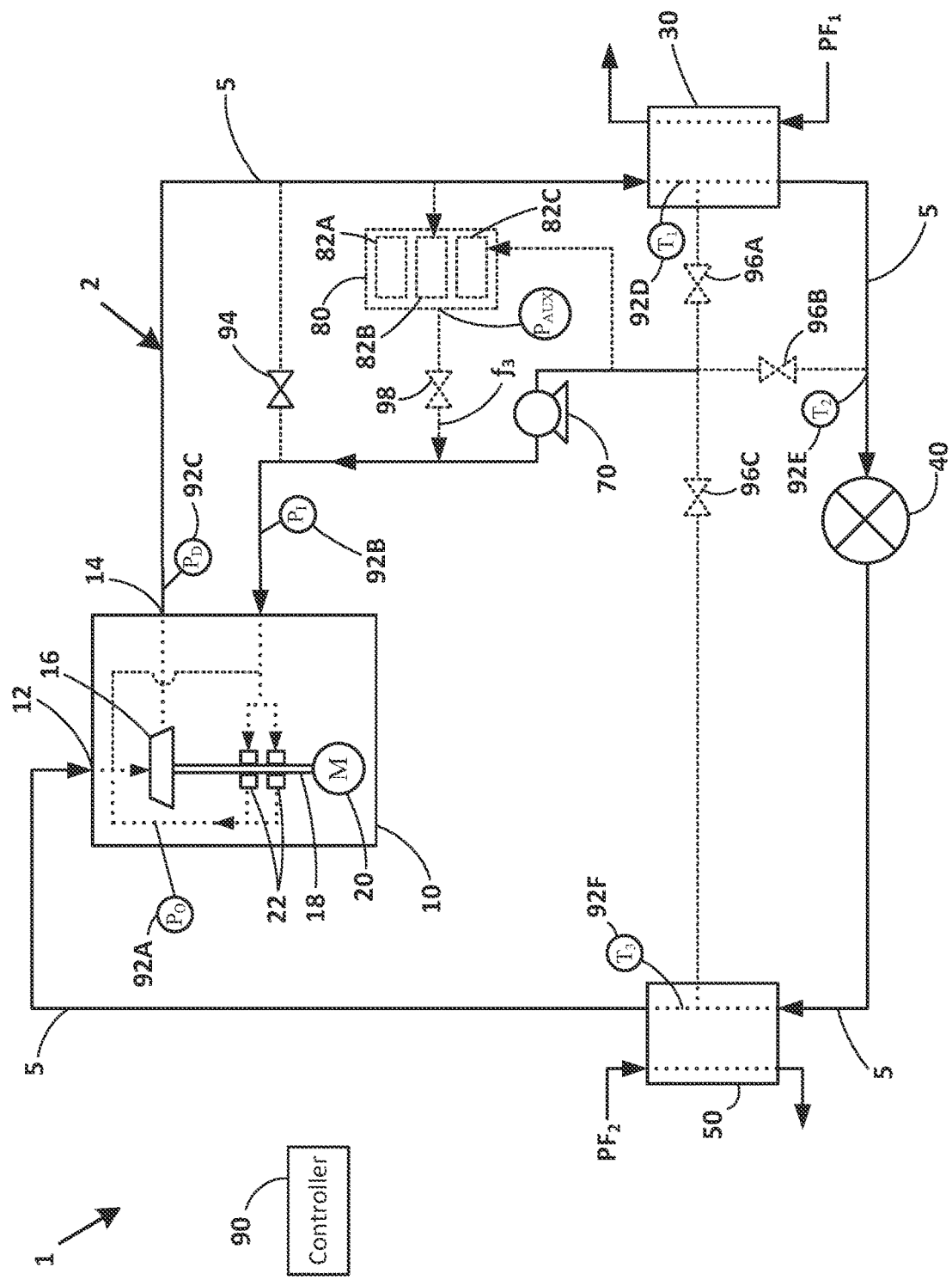
FIG. 2C is a schematic diagram of the refrigerant circuit in FIG. 1 operating in a third mode, according to an embodiment.

FIG. 2B shows the refrigerant circuit 2 operating in a second mode. In the second mode, the refrigerant circuit 2 supplies a feed of liquid working fluid $f_2$ to the gas bearing(s) 22. For example, the second mode may be employed during the startup of the compressor 10. For example, a compressed gas bypass valve 94 is closed, liquid bypass valve(s) 96A, 96B, 96C are open, auxiliary gas supply valve 98 is closed, and the pump 70 is active such that the liquid working fluid $f_2$ is pumped to the gas bearing(s). The gas bearing(s) 22 utilize the liquid working fluid to support the driveshaft 18 in the second mode. The second mode is a backup mode that can advantageously prevent instability in supporting the driveshaft 18 and prevent damage to the gas bearing(s) 22 by utilizing liquid working fluid $f_2$ in the gas bearing(s) 22. The second mode can also advantageously allow for the compressor 10 to continue operating while being unable to supply gaseous working fluid to the gas bearing(s) 22 at a sufficient pressure. The second mode can also be referred to as a "liquid supply mode".

The refrigerant circuit 2 is configured to operate in the second mode in response to the pressure differential across the gas bearing(s) 22 using compressed gaseous working fluid (e.g., using compressed gaseous working fluid from the compressor 10) is less than the predetermined pressure minimum $P_{min}$. The refrigerant circuit 2 can operate in the second mode when supplying the compressed gaseous working fluid from the compressor 10 (e.g., in the first mode) results in the pressure differential across the gas bearing(s) 22 being less than the predetermined amount. For example, the refrigerant circuit 2 operates in the second mode when the compressor 10 (e.g., discharged from the compression mechanism 16) is not generating compressed gaseous working fluid at sufficiently high pressure to maintain the pressure differential across the gas bearing(s) 22 at or above the predetermined pressure minimum $P_{Min}$.

The liquid working fluid $f_2$ is a liquid portion of the working fluid in the refrigerant circuit 2 (e.g., condensed working fluid) that is pumped from one or more locations in the refrigerant circuit 2. In the second mode, the refrigerant circuit 2 is configured to supply, using the pump 70, compressed liquid working fluid to the gas bearing(s) 22. The controller 90 can activate the pump 70 for the second mode. The pumping/operation of the pump 70 suctions working fluid from one or more locations in the refrigerant circuit 2 and discharges compressed liquid fluid $f_2$. The compressed liquid working fluid $f_2$ then flows from the pump 70 to the gas bearing(s) 22.

When first operating in the second mode, the liquid working fluid $f_2$ may evaporate as it flows through the gas bearing(s) 22. As the liquid working fluid $f_2$ cools the gas bearing(s) 22. Once reaching a steady state temperature in the second mode, at least some of the working fluid $f_2$ remains liquid flowing out of the gas bearing(s) 22. The liquid working fluid is discharged from the gas bearing(s) and can drain into the bottom of the compressor 10 (e.g., a lower volume of the housing of the compressor 10).

In an embodiment, the compressed liquid working fluid $f_2$ is supplied to the gas bearing(s) 22 at a higher pressure (in the second mode) than the compressed gaseous working fluid $f_1$ is supplied to the gas bearing(s) 22 (in the first mode) (e.g., with the compressor 10 having the same operating conditions, e.g., same saturation suction temperature for the compressor 10, and the like). For example, the pressure of compressed liquid working fluid $f_2$ discharged from the pump 70 is greater than the discharge pressure $P_D$ of the compressor 10 in the first mode. Inlet pressure $P_I$ of gas bearing(s) is higher in the second mode than in the first mode. In an embodiment, the pressure of the compressed liquid working fluid $f_2$ supplied to the gas bearing(s) 22 is at or above 50 psid (pounds per square inch differential). In an embodiment, the pressure of the compressed liquid working fluid $f_2$ supplied to the gas bearing(s) 22 is at or above 60 psid. In an embodiment, the pressure of the compressed liquid working fluid $f_2$ supplied to the gas bearing(s) 22 is at or above 70 psid. In an embodiment, the pressure of the compressed liquid working fluid $f_2$ supplied to the gas bearing(s) 22 is at or above 80 psid.

The liquid working fluid can be liquid working fluid pumped/supplied from one or more locations within the refrigerant circuit 2. For example, the liquid working fluid can be supplied from the condenser 30, from between the condenser 30 and the evaporator 50 (e.g., downstream of the condenser 30 and upstream of the evaporator 50), and/or from the evaporator 50. As shown in FIG. 2B, the liquid working fluid supplied from between the condenser 30 and evaporator 50 may be from between the condenser 30 and expansion valve 40 (e.g., downstream of the condenser 30 and upstream of the expansion valve 40). In an embodiment, the location between the condenser 30 and the evaporator 50 may be from between the expansion valve 40 and evaporator 50 (e.g., downstream of the expansion valve 40 and upstream of the evaporator 50).

When operating in the second mode, the compressed liquid working fluid $f_2$ is supplied to the gas bearing(s) 22. The pressure differential $P_{AL}$ across the bearing(s) 22 is the difference between the inlet pressure $P_I$ (e.g., the pressure $P_I$ of the compressed liquid working fluid $f_2$) and the outlet pressure $P_O$ of the gas bearing(s) 22, when using the compressed liquid working fluid $f_3$. $P_{AL}$ is used herein to indicate the pressure differential of the gas bearing(s) 22 when using the liquid working fluid $f_2$.

In the second mode, the compressor 10 operates at or below a liquid maximum speed limit. In the second mode, the controller 90 is configured to prevent the compressor 10 from operating at or above the liquid maximum speed limit. The liquid maximum speed limit is a predetermined maximum speed for the compressor 10 to operate using the compressed liquid working fluid $f_1$ in the gas bearing(s) 22. For example, the liquid maximum speed limit is based on the gas bearing(s) 22 providing stable support of the driveshaft 10 using the compressed liquid working fluid $f_2$. The controller 90 is configured to prevent the compressor 10 from operating at or above the liquid maximum speed limit in the second mode. For example, the controller 90 operates the compressor 10 at the liquid maximum speed limit when a target speed for the compressor 10 is above the liquid maximum speed limit. The liquid maximum speed limit is less than the gas maximum speed limit of the compressor 10 in the first mode. For example, the compressor 10 operates at lower speeds in the second mode using the compressed liquid working fluid $f_2$ than in the first mode using the compressed gaseous working fluid $f_2$ in the first mode.

The pressure of the compressed liquid working fluid $f_2$ supplied to the gas bearing(s) (e.g., inlet pressure $P_I$) and the outlet pressure of the gas bearing(s) 22 (e.g., outlet pressure $P_O$) may vary with operation of the refrigerant circuit 2, which effects the pressure differential across the gas bearing(s) 22. In an embodiment, the liquid maximum speed limit may be in the form of a predetermined variable maximum speed limit that varies with the pressure differential across the gas bearing(s). In an embodiment, a predetermined variable maximum speed limit may be stored in the controller 90 (e.g., in the memory of the controller 90) in the form a function (e.g., maximum speed limit as a function of the inlet pressure $P_O$, maximum speed limit as a function of the pressure differential $P_{AL}$ across the bearing(s) 90). In an embodiment, a predetermined variable maximum speed limit may be stored in the controller 90 (e.g., in the memory of the controller 90) in the form of a table (e.g., a respective predetermined value for maximum speed limit stored for each inlet pressure $P_O$/pressure differential $P_{AL}$, a respective predetermined value for different range of inlet pressure $P_O$/pressure differential $P_{AL}$).

FIG. 2C shows the refrigerant circuit 2 operating in a third mode. The third mode can also be referred to as a "backup gas supply mode". In the third mode, the refrigerant circuit 2 operates the auxiliary gas source 80 to supply a feed of compressed gaseous working fluid $f_3$ to the gas bearing(s) 22. For example, the compressed gas bypass valve 94 is closed, liquid bypass valve(s) 96A, 96B, 96C are closed, the auxiliary gas supply valve 98, and the pump 70 is not operating in the third mode such that the compressed gaseous working fluid $f_3$ flows from the auxiliary gas supply to the bearing(s) 22. Similar to the first mode, the gas bearing(s) 22 utilize compressed gaseous working fluid to support the driveshaft 18 in third mode. The third mode is a backup mode that can at least temporarily provide compressed gaseous working fluid to the gas bearing(s) 22 when the compressor 10 is unable to provide gaseous working fluid at an adequate pressure to stably support the driveshaft 18.

When operating in the third mode, the compressed gaseous working fluid $f_3$ is supplied to the gas bearing(s) 22. The pressure differential $P_{AGB}$ across the bearing(s) 22 is the difference between the inlet pressure $P_I$ (e.g., the pressure $P_I$ of the compressed gaseous working fluid $f_3$) and the outlet pressure $P_O$ of the gas bearing(s) 22, when using the compressed gaseous working fluid $f_3$ supplied from the auxiliary gas source 80. $P_{AGB}$ is used herein to indicate the pressure differential of the gas bearing(s) 22 when using the compressed gaseous working fluid $f_3$ supplied from the auxiliary gas supply 80.

The refrigerant circuit 2 is configured to operate in the third mode in response to the pressure differential $P_{AG}$ across the gas bearing(s) 22 using compressed gaseous working fluid $f_1$ from the compressor 10 (e.g., operating in the first mode) being less than the predetermined pressure minimum $P_{Min}$ and the auxiliary gas source 80 being able to supply its compressed gaseous working fluid $f_3$ at an adequate pressure. Adequate pressure being a pressure that results in the pressure differential $P_{AGB}$ across the bearing(s) 22 when using said compressed gaseous working fluid $f_3$ being equal to or greater than the predetermined pressure minimum $P_{Min}$ (e.g., $P_{AGB} \geq P_{Min}$).

The third mode includes activating the auxiliary gas supply 80. In an embodiment, activating the auxiliary gas supply 80 can include activating the storage container 82A. For example, activating the storage container 82A can include opening/throttling a valve for the storage container (e.g., opening/throttling auxiliary gas supply valve 98). For example, activating the storage container 82 can include a check valve opening (e.g., auxiliary gas supply valve 98 being a check valve that opens when the pressure of the compressed gaseous working fluid $f_1$ results in $P_{AG} < P_{Min}$). In an embodiment, activating the auxiliary gas supply 80 can include activating the auxiliary compressor 82B (e.g., controller 90 activating the auxiliary compressor 82B). In an embodiment, activating the auxiliary gas supply 80 can include activating the vaporizer 82C. For example, directing liquid into the container of the vaporizer 82C (e.g., pumping liquid into the vaporizer with a pump (not shown)), heating and vaporizing liquid within the container, opening a valve for the container at the desired pressure (e.g., opening/throttling auxiliary gas supply valve 98) to supply the generated gaseous working fluid to the gas bearing(s) 22.

Figure 3:
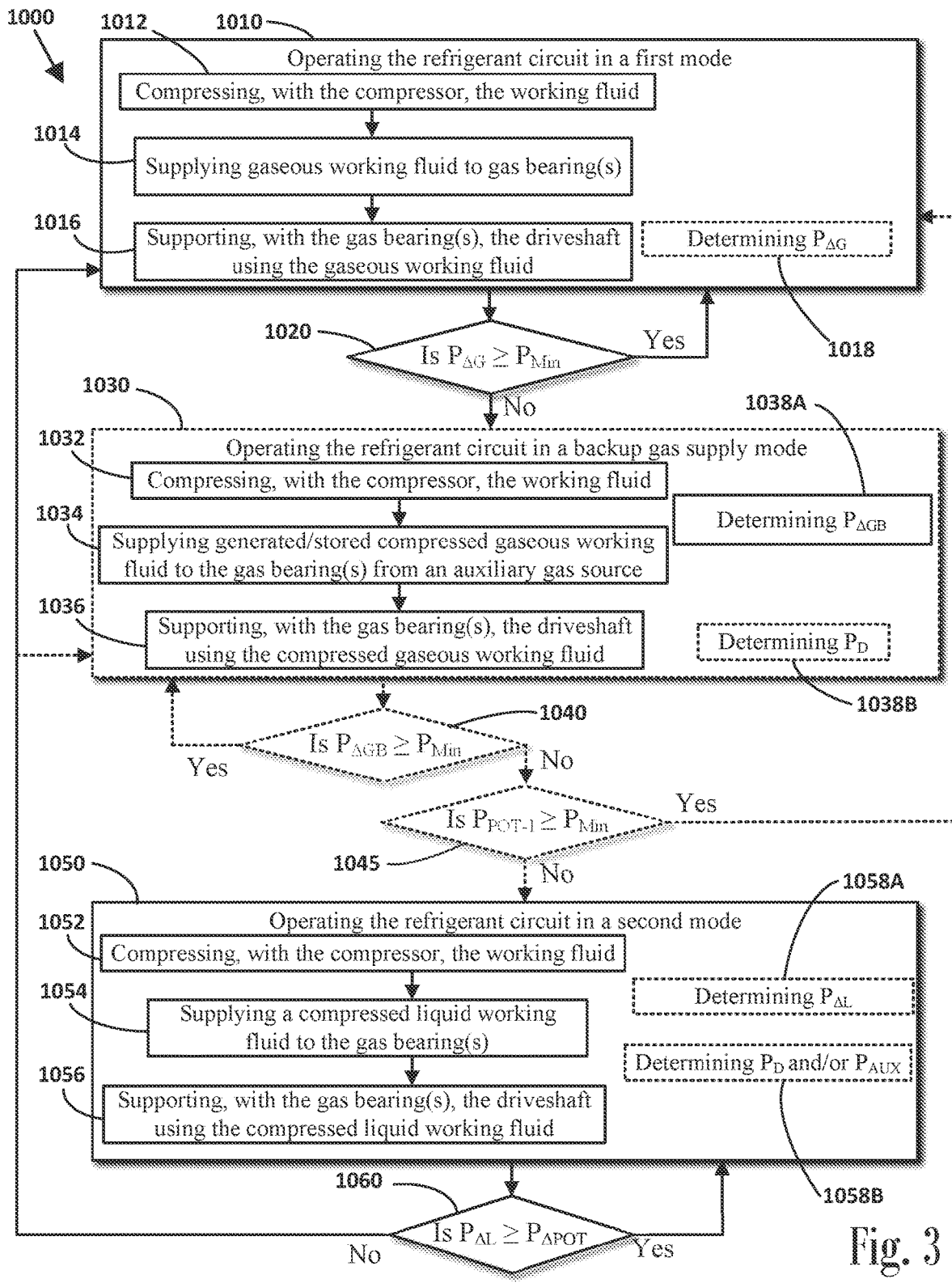
FIG. 3 is a block flow diagram of an embodiment of a method of operating a refrigerant circuit.

FIG. 3 is a block flow diagram of an embodiment of a method 1000 of operating a refrigerant circuit in a HVACR system. In an embodiment, the method 1000 may be for operating the refrigerant circuit 2 in the HVACR system 1 in FIGS. 1-2B. For example, the method may be carried out by a controller of the refrigerant circuit (e.g., controller 90). The refrigerant circuit contains a working fluid and includes a compressor (e.g., compressor 10), a condenser (e.g., condenser 30), an expander (e.g., expander 40), and an evaporator (e.g., evaporator 50). The method 1010 starts at 1010.

At 1010, the refrigerant circuit operates in a first mode (e.g., a first mode as shown in FIG. 2A). Operating in the first mode 1010 includes the compressor compressing the working fluid at 1012. The compressor compressing the working fluid 1012 includes setting a speed for the compressor. Setting a speed for the compressor can include preventing the compressor from operating at or above a gas maximum speed limit. For example, determining a target speed for the compressor based on a cooling requirement for the HVACR system and preventing the compressor the compressor at or above a gas maximum speed limit.

Operating in the first mode 1010 also includes supplying a gaseous portion of the working fluid to one or more gas bearing(s) of the compressor (e.g., gas bearing(s) 22) at 1014 and the gas bearing(s) supporting the driveshaft of the compressor (e.g., driveshaft 18) using the gaseous portion of the working fluid at 1016.

In an embodiment, the gas bearing(s) may include one or more aerostatic gas bearing(s). The gaseous portion of the working fluid supplied to the gas bearing(s) at 1014 is a compressed gaseous portion of the working fluid (e.g., compressed gaseous working fluid $f_1$) and the supporting of driveshaft at 1016 includes the aerostatic gas bearing(s) using the compressed gaseous working fluid to support the driveshaft (e.g., each distributing the compressed gaseous working fluid to form a layer of the compressed gaseous working fluid between the aerostatic gas bearing and the driveshaft that supports/levitates the driveshaft)). The compressed gaseous portion of the working fluid at 1012 is a portion of the working fluid compressed by the compressor.

For example, a portion of compressed gaseous working fluid discharged from the compression mechanism of the compressor (e.g., compression mechanism 16).

In an embodiment, the gas bearing(s) may include one or more hydrodynamic gas bearing(s). The gaseous portion of the working fluid supplied to the gas bearing(s) at 1014 is a gaseous portion of the working fluid within the compressor (e.g., portion of the gaseous working fluid to be compressed by the compression mechanism 16, inlet gaseous working fluid $f_1$). The supplying of the gaseous portion of the working fluid to the gas bearing(s) at 1014 can include the hydrodynamic gas bearing(s) suctioning and compressing the gaseous working fluid (e.g., using the spinning surface of the driveshaft 16), and the supporting of the driveshaft at 1016 includes supporting the driveshaft using the gaseous gas compressed by the hydrodynamic gas bearing(s).

Operating in the first mode 1010 also includes determining a pressure differential (e.g., pressure differential $P_{\Delta G}$) of the gas bearing(s) at 1018. This is the pressure differential of the gas bearing(s) when using the gaseous working fluid. Determining the pressure differential of the gas bearing(s) at 1018 can include sensing an inlet pressure (e.g., inlet pressure $P_I$) of the gas bearing(s), sensing an outlet pressure (e.g., outlet pressure $P_O$) of the gas bearing(s). The pressure differential being the difference between the inlet pressure and the outlet pressure of the gas bearing(s). The method 1000 then proceeds to 1020.

At 1020, the determined pressure differential is compared to a pressure minimum (e.g., pressure minimum $P_{Min}$). If the pressure differential is equal to or greater than the pressure minimum (i.e., $P_{\Delta G} \geq P_{Min}$), then the method 1000 proceeds back to 1010 (e.g., continues operating in the first mode at 1010). If the pressure differential is less than the pressure minimum (i.e., $P_{\Delta G} < P_{Min}$), then the method 1000 can proceed to 1030.

At 1030, the refrigerant circuit operates in a backup gas supply mode (e.g., a third mode as shown in FIG. 2C). The third mode 1030 includes the compressor compressing the working fluid at 1032. For example, the compressor may be configured to operate at 1032 in a similar manner to the operation of the compressor in the first mode 1020 at 1012 (e.g., using similar operating parameters, having a same speed limit, or the like). The third mode 1030 also includes supplying generated/stored compressed gaseous working fluid (e.g., compressed gaseous working fluid $f_3$) from an auxiliary gas source (e.g., auxiliary gas source 80) to the gas bearing(s) at 1034, and the gas bearing(s) supporting the driveshaft of the compressor using the compressed gaseous working fluid at 1036.

In an embodiment, the auxiliary gas source may be/include a storage container (e.g., storage container 82A) configured to store a portion of the gaseous working fluid compressed by the compressor during previous/normal operation of the compressor (e.g., during the first mode 1010). In such an embodiment, the supplying of the generated/stored compressed gaseous working fluid at 1034 can be supplying the stored compressed gaseous working fluid from the storage container to the gas bearing(s) of the compressor. In such an embodiment, the first mode 1030 may also include storing a portion of the compressed gaseous working fluid at 1012 in the storage container.

In an embodiment, the auxiliary gas source may be an auxiliary compressor. In such an embodiment, the supplying of the generated/stored compressed gaseous working fluid at 1034 can include suctioning and compressing, with the auxiliary compressor, gaseous working fluid in the refrigerant circuit to generate compressed gaseous working fluid, and supplying the generated compressed gaseous working fluid from the auxiliary compressor to the gas bearing(s) of the compressor.

In an embodiment, the auxiliary gas source may be a vaporizer that includes a heater and a container. In such an embodiment, the supplying of the generated/stored compressed gaseous working fluid at 1034 can include generating gaseous working fluid by the heater vaporizing a portion of the liquid working fluid from the refrigerant circuit within the container to generate compressed gaseous working fluid in the container, and supplying the generated compressed gaseous working fluid from the vaporizer to the gas bearing(s) of the compressor.

Operating in the backup gas supply mode 1030 also includes determining a pressure differential (e.g., pressure differential $P_{\Delta GB}$) of the gas bearing(s) at 1038A. This is the pressure differential of the gas bearing(s) when using the compressed gaseous working fluid supplied from the auxiliary gas source. Determining the pressure differential of the gas bearing(s) at 1038A can include sensing the inlet pressure (e.g., inlet pressure $P_I$) of the gas bearing(s), sensing an outlet pressure (e.g., outlet pressure $P_O$) of the gas bearing(s). The pressure differential being the difference between the inlet pressure and the outlet pressure of the gas bearing(s).

Operating in the backup supply mode 1030 can also include determining a compressor discharge pressure (e.g., compressor discharge pressure $P_D$) at 1038B. For example, the compressor discharge pressure is the current pressure of the compressed gaseous working fluid discharged from a compression mechanism of the compressor (e.g., compression mechanism 16). The compressor discharge pressure may be determined at 1038B directly using a pressure sensor (e.g., discharge pressure sensor 92C) or based on detecting the speed of the compressor 16 (e.g., speed of the motor 20, electrical power being provide to the motor 20, or the like). The method 1000 then proceeds to 1040.

At 1040, the determined pressure differential 1038 is compared to the pressure minimum (e.g., the pressure minimum $P_{Min}$ for operating using compressed gaseous working fluid). If the pressure differential is equal to or greater than the pressure minimum (i.e., $P_{\Delta GB} \geq P_{Min}$), then the method 1000 proceeds back to 1030 (e.g., continues operating in the backup gas supply mode at 1030). If the pressure differential is less than the pressure minimum (i.e., $P_{\Delta GB} \leq P_{Min}$), then the method 1000 proceeds to 1045.

At 1045, a first mode potential gas pressure differential (e.g., first mode potential gas pressure differential $P_{\Delta POT-1}$) is compared to a pressure minimum (e.g., pressure minimum $P_{Min}$). The first mode potential gas pressure differential is a determined gas pressure differential based on using a gas discharge pressure of the compressor (e.g., based on the discharge pressure $P_D$ determined at 1058B) as would be used for operating in the first mode at 1010. For example, the comparison at 1045 is for determining whether the compressor is operating normally such that its gaseous working fluid compressed by the compressor (e.g., the compressed gaseous working fluid $f_1$) is at a sufficient pressure for properly operating the gas bearing(s).

In an embodiment, at 1045, if the first mode potential gas pressure differential is at or greater than the pressure minimum (e.g., $P_{\Delta POT-1} \geq P_{Min}$), then the method 1000 proceeds back to 1010 (e.g., returns to operating in the first mode). If the first mode potential gas pressure differential is less than the pressure minimum (e.g., $P_{\Delta POT-1} < P_{Min}$), then the method 1000 proceeds back to 1050. At 1050, the refrigerant circuit operates in a second mode (e.g., a second mode as shown in FIG. 2B). In the second mode 1050 includes the compressor compressing the working fluid at 1052. The compressor compressing the working fluid 1052 includes setting a speed for the compressor. Setting a speed for the compressor can include preventing the compressor from operating at or above a liquid maximum speed limit. For example, determining a target speed for the compressor based on a cooling requirement for the HVACR system and preventing the compressor the compressor at or above a liquid maximum speed limit. The liquid maximum speed limit at 1052 is configured to be a lower speed than the gas maximum speed limit used at 1012.

Operating in the second mode 1050 also includes supplying a compressed liquid portion of the working fluid (e.g., compressed liquid working fluid $f_2$) to the one or more gas bearing(s) of the compressor at 1054 and the gas bearing(s) supporting the driveshaft of the compressor using the compressed liquid working fluid at 1056. Supplying the compressed liquid portion of the working fluid to the one or more gas bearing(s) at 1054 can include a pump (e.g., pump 70) pumping compressed liquid working fluid into the gas bearing(s). The operation of the pump suctions liquid working fluid in the refrigerant circuit to the pump, compresses the liquid working fluid within the pump, and supplies the compressed liquid working fluid to the gas bearing(s).

Operating in the second mode 1050 also includes determining a pressure differential (e.g., pressure differential $P_{AL}$) of the gas bearing(s) at 1058A. The pressure differential of the gas bearing(s) at 1058 is when using the compressed liquid working fluid. Determining the pressure differential of the gas bearing(s) at 1058A can include sensing an inlet pressure (e.g., inlet pressure $P_I$) of the gas bearing(s), sensing an outlet pressure (e.g., outlet pressure $P_O$) of the gas bearing(s). The pressure differential can be the difference between the inlet pressure and the outlet pressure of the gas bearing(s) when using the compressed liquid working fluid.

Operating in the second mode 1050 also includes determining a compressor discharge pressure (e.g., compressor discharge pressure $P_D$) and/or determining auxiliary gas source discharge pressure (e.g., auxiliary gas source discharge pressure $P_{Aux}$) at 1058B. For example, the compressor discharge pressure is the current pressure of the compressed gaseous working fluid discharged from a compression mechanism of the compressor (e.g., compression mechanism 16). For example, the auxiliary gas source discharge pressure is the pressure of compressed gaseous working fluid contained within the auxiliary gas source (e.g., in the storage container, in the container of the vaporizer). For example, the auxiliary gas source discharge pressure is an expected discharge pressure of the auxiliary compressor for the auxiliary gas source, if the auxiliary compressor were active. The method 1000 proceeds to 1060.

At 1060, the determined pressure differential at 1058A is compared to a potential gas pressure differential (e.g., potential gas pressure differential $P_{APOT}$). The potential gas pressure differential is a determined gas pressure differential based on operating in other modes of the refrigerant circuit. For example, a potential gas pressure differential based on using a gas discharge pressure of the compressor (e.g., discharge pressure $P_D$ determined at 1058B) as would be used for operating in the first mode at 1010. For example, a potential gas pressure differential based on using gas pressure of the compressed gaseous working fluid capable of being generated/supplied by the auxiliary gas source (e.g., gas pressure $P_{AUX}$ of the gaseous working contained within the storage container of the auxiliary compressor determined at 1058B, of the gaseous working fluid contained in the container of the vaporizer, and/or of being compressed gaseous working fluid that can be discharged from the auxiliary compressor of the auxiliary gas source 80).

In an embodiment, at 1060, if the pressure differential using liquid at 1058 the is equal to or greater than the potential gas pressure differential (i.e., $P_{AL} \geq P_{APOT}$), then the method 1000 proceeds back to 1050 (e.g., continues operating in the second mode at 1050). If the pressure differential using liquid at 1058 is less than the potential gas pressure differential (i.e., $P_{AL} < P_{APOT}$), then the method 1000 proceeds back to 1030 or 1050. When the potential gas pressure differential is based on operating in the backup gas supply mode (e.g., based on gas pressure $P_{AUX}$), the method 1000 proceeds back to 1030. When the potential gas pressure differential is based on operating in the first mode (e.g., based on the discharge pressure $P_D$), the method 1000 proceeds back to 1050.

In an embodiment, at 1060, a predetermined proportion of the determined pressure differential at 1058 is compared to a potential gas pressure differential (e.g., potential gas pressure differential $P_{APOT}$). For example, the comparison at 1050 compares a percentage of the determined pressure differential at 1058 to the potential gas pressure differential (e.g., X % of $P_{AL} \geq P_{APOT}$). In an embodiment, the predetermined proportion is greater than 1% and equal to or less than 100% of the determined pressure differential at 1058. In an embodiment, the predetermined proportion is greater than 60% and equal to or less than 100% of the determined pressure differential at 1058. In an embodiment, the predetermined proportion is greater than 60% and equal to or less than 90% of the determined pressure differential at 1058. In an embodiment, the predetermined proportion is greater than 60% and equal to or less than 80% of the determined pressure differential. In an embodiment, the predetermined proportion is at or about 70% of the determined pressure differential at 1058.

In the illustrated embodiment, in FIG. 3, the method 1000 is shown as starting at 1010. However, in another embodiment, the method 1000 may start at 1030 or 1050.

In an embodiment, a refrigerant circuit may not include the auxiliary gas source. In such an embodiment, when the pressure differential determined at 1016 is less than the pressure minimum (i.e., $P_{AG} < P_{Min}$) at 1020, the method 1000 may proceed from 1020 directly to 1050 (e.g., skipping 1030, 1040, and 1045). For example, the method 1000 can switch from operating the refrigerant circuit the first mode 1010 to operating the refrigerant circuit in the second mode 1050 based on the pressure differential of the gas bearing(s).

In an embodiment, the gas bearing(s) may be hydrodynamic gas bearing(s), as discussed above with respect to operating the refrigerant circuit in the first mode 1010. In such an embodiment, the method 1000 may be configured to switch to and from the first mode based on the speed of the compressor instead of based on the pressure difference P and/or potential pressure difference across the gas bearing. For example, each of the modes 1010, 1020, 1030 can include determining a speed of the compressor. The speed of the compressor may be determined directly (e.g., from a sensor on the driveshaft 18, or the like) or indirectly (e.g., based on detected electrical power being provided/drawn by the motor 20, or the like)

For example, the comparison at 1020 may compare a determined speed of the compressor to a bearing speed minimum. The method 1000 proceeds back to operating in the first mode 1010 (e.g., continues operating in the first mode 1010) when the compressor speed is greater than the bearing speed minimum; and when the compressor speed is less than the bearing speed minimum, the method 1000 proceeds to operating in the backup supply mode 1030 (if the refrigerant circuit does not include the auxiliary gas source, then method 1000 proceeds from 1020 to the second mode 1050). For example, the comparison at 1045 may compare a determined speed of the compressor to a bearing speed minimum. The method 1000 returns to operating in the first mode 1010 (e.g., switches from the backup gas supply mode 1030 to the first mode 1010) when the compressor speed is greater than the bearing speed minimum; and when the compressor speed is less than the bearing speed minimum, the method 1000 proceeds to operating in the third mode 1050 (e.g., switches from the backup gas supply mode 1030 to the third mode 1050).

For example, the comparison at 1060 can include comparing a determined speed of the compressor to a bearing speed minimum; when the compressor speed is greater than the bearing speed minimum, the method 1000 returns to operating in the first mode 1010 (e.g., switches from the second mode 1050 to the first mode 1010); and when the compressor speed is less than the bearing speed minimum, the method 1000 returns to the second mode 1050 (e.g., continues operating in the second mode 1050) or returns to the backup gas supply mode 1030 (e.g., switches from the second mode 1050 to the backup supply mode 1050). The method 1000 returns to the second mode 1050 or the backup gas supply mode 1030 based on comparison between the pressure differential using liquid at 1058 and the potential gas pressure differential as discussed above for 1060.

It should be appreciated that the method 1000 in an embodiment may be modified to have one or more of the features as discussed above for the HVACR 1 in FIGS. 1-2C.

Aspects

Any of Aspects 1-11 may be combined with any of Aspects 12-21.

Aspect 1. A method of operating a refrigerant circuit, the refrigerant circuit including a compressor having a driveshaft and one or more gas bearings to support the driveshaft, the method comprising: operating the refrigerant circuit in a first mode, which includes: compressing, with the compressor, a working fluid in the refrigerant circuit, supplying a gaseous portion of the working fluid to the one or more gas bearings of the compressor, and supporting, with the one or more gas bearings, the driveshaft of the compressor using the gaseous portion of the working fluid; and operating the compressor in a second mode, which includes: compressing, with the compressor, the working fluid, supplying a liquid portion of the working fluid in the refrigerant circuit to the one or more gas bearings of the compressor, and supporting, with the one or more gas bearings, the driveshaft of the compressor using the liquid portion of the working fluid.

Aspect 2. The method of Aspect 1, wherein the refrigerant circuit includes a pump, and the operating of the refrigerant circuit in the second mode includes: suctioning and compressing the liquid portion of the working fluid, and supplying the liquid portion of the working fluid compressed by the pump to the one or more gas bearings of the compressor.

Aspect 3. The method of any one of Aspects 1 and 2, wherein the compressing, with the compressor, of the working fluid in the first mode includes preventing the compressor from operating above a gas maximum speed limit, the compressing, with the compressor, of the working fluid in the second modes includes preventing the compressor from operating above a liquid maximum speed limit, and the liquid maximum speed limit is less than the gas maximum speed limit.

Aspect 4. The method of any one of Aspects 1-3, wherein the liquid portion of the working fluid supplied to the one or more gas bearings in the second mode has a higher pressure than the gaseous portion of the working fluid supplied to the one or more gas bearings in the first mode.

Aspect 5. The method of any one of Aspects 1-4, wherein the operating of the refrigerant circuit in the first mode includes determining a pressure differential of the one or more gas bearings, the pressure differential being a difference between an inlet pressure of the gaseous portion of the working fluid into the one or more gas bearings and an outlet pressure of the gaseous portion exiting the one or more gas bearings.

Aspect 6. The method of Aspect 5, further comprising: switching the refrigerant circuit between operating in the first mode and operating in the second mode based on the pressure differential of the one or more gas bearings.

Aspect 7. The method of any one of Aspects 5 and 6, further comprising: switching the refrigerant circuit to operate in a different mode than the first mode, in response to the pressure differential of the one or more gas bearings being less than a predetermined pressure minimum.

Aspect 8. The method of Aspect 7, wherein the different mode than the first mode is the second mode.

Aspect 9. The method of anyone of Aspects 1-8, further comprising: operating the refrigerant circuit in a third mode, the third mode being a different mode than the first mode, wherein the operating of the refrigerant circuit in a third mode includes: compressing, with the compressor, the working fluid in the refrigerant circuit, supplying a compressed gaseous portion of the working fluid from an auxiliary gas supply to the one or more gas bearings, the compressed gaseous portion of the working fluid from the auxiliary gas supply being at least one of stored and generated in the auxiliary gas supply, and supporting, with the one or more gas bearings, the driveshaft of the compressor using the compressed gaseous portion of the working fluid supplied from the auxiliary gas supply.

Aspect 10. The method of any one of Aspects 1-9, wherein the one or more gas bearings include an aerostatic gas bearing, and the gaseous portion of the working fluid is a gaseous portion of the working fluid compressed by the compressor.

Aspect 11. The method of any one of Aspects 1-9, wherein the gas bearing is a hybrid gas bearing, the supplying of the gaseous portion of the working fluid to the one or more gas bearings of the compressor includes the hybrid gas compressing the gaseous portion of the working fluid.

Aspect 12. A refrigerant circuit in an HVACR system, comprising: a compressor including a driveshaft, a compression mechanism coupled to the driveshaft, a motor to rotate the driveshaft causing the compression mechanism to compress a working fluid in the refrigerant circuit, and one or more gas bearings to support the driveshaft while the driveshaft rotates; a condenser to cool the working fluid compressed by the compressor; an expander to expand the working fluid; an evaporator to heat the working fluid with a process fluid; a main flow path traveling through the compressor, the condenser, the expander, and the evaporator, and back to the compressor; a pump fluidly connected to the one or more gas bearings of the compressor; and a controller configured to selectively operate the refrigerant circuit in a least a first mode and a second mode, wherein operating the refrigerant circuit in the first mode includes: supplying a gaseous portion of the working fluid to the one or more gas bearings of the compressor, and supporting, with the gas bearing, the driveshaft of the compressor using the gaseous portion of the working fluid, and wherein operating the refrigerant circuit in the second mode includes: supplying, with the pump, a liquid portion of the working fluid to the one or more gas bearings of the compressor, and supporting, with the one or more gas bearings, the driveshaft of the compressor using the liquid portion of the working fluid.

Aspect 13. The refrigerant circuit of Aspect 12, wherein the operating of the refrigerant circuit in the second mode includes: the pump suctioning and compressing the liquid portion of the working fluid, and supplying the liquid portion of the supplying the liquid portion of the working fluid compressed by the pump to the one or more gas bearings of the compressor.

Aspect 14. The refrigerant circuit of any one of Aspects 12 and 13, wherein the controller is configured to prevent the compressor from operating above a gas maximum speed limit in the first mode and from operating above a liquid maximum speed limit in the second mode, and the liquid maximum speed limit is less than the gas maximum speed limit.

Aspect 15. The refrigerant circuit of any one of Aspects 12-14, wherein the pump is configured to supply the liquid portion of the working fluid to the one or more gas bearings in the second mode at a higher pressure than the gaseous portion of the working fluid is supplied to the one or more gas bearings in the first mode.

Aspect 16. The refrigerant circuit of any one of Aspects 12-15, wherein the controller is configured to determine a pressure differential of the one or more gas bearings in the first mode, the pressure differential being a difference between an inlet pressure of the gaseous portion of the working fluid into the one or more gas bearings and an outlet pressure of the gaseous portion exiting the one or more gas bearings.

Aspect 17. The refrigerant circuit of Aspect 16, further comprising: a first sensor for detecting the inlet pressure of the gaseous portion of the working fluid into the one or more gas bearings, and an second sensor to detect the outlet pressure of the gaseous portion exiting the one or more gas bearings, wherein the controller is configured to determine the pressure differential of the bearing based on the inlet pressure detected via the first sensor and the outlet pressure detected via the second sensor.

Aspect 18. The refrigerant circuit of any one of Aspects 16 and 17, wherein the controller is configured to switch the refrigerant circuit between operating in the first mode and operating in the second mode based on the pressure differential of the one or more gas bearings.

Aspect 19. The refrigerant circuit of any one of Aspects 16-18, wherein the controller is configured to switch the refrigerant circuit to operate in a different mode than the first mode in response to the pressure differential of the one or more gas bearings being less than a predetermined pressure minimum.

Aspect 20. The refrigerant circuit of Aspect 19, wherein the different mode than the first mode is the second mode.

Aspect 21. The refrigerant circuit of any one of Aspects 12-20, further comprising: an auxiliary gas supply, wherein the controller is configured to selectively operate the refrigerant circuit in at least the first mode, the second mode, and a third mode, wherein the operating of the refrigerant circuit in a third mode includes: supplying a compressed gaseous portion of the working fluid from an auxiliary gas supply to the one or more gas bearings, the compressed gaseous portion of the working fluid from the auxiliary gas supply being at least one of stored and generated in the auxiliary gas supply, and supporting, with the one or more gas bearings, the driveshaft of the compressor using the compressed gaseous portion of the working fluid supplied from the auxiliary gas supply.

The terminology used herein is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components. In an embodiment, "connected" and "connecting" as described herein can refer to being "directly connected" and "directly connecting".

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A method of operating a refrigerant circuit, the refrigerant circuit including a compressor having a driveshaft and one or more gas bearings to support the driveshaft, the method comprising:
   operating the refrigerant circuit in a first mode, which includes:
      compressing, with the compressor, a working fluid in the refrigerant circuit,
      supplying a gaseous portion of the working fluid to the one or more gas bearings of the compressor, and
      supporting, with the one or more gas bearings, the driveshaft of the compressor using the gaseous portion of the working fluid; and
   operating the refrigerant circuit in a second mode, which includes:
      compressing, with the compressor, the working fluid,
      supplying a liquid portion of the working fluid in the refrigerant circuit to the one or more gas bearings of the compressor, the liquid portion of the working fluid being substantially liquid, and
      supporting, with the one or more gas bearings, the driveshaft of the compressor using the liquid portion of the working fluid.

2. The method of claim 1, wherein the one or more gas bearings include an aerostatic gas bearing, and
   the gaseous portion of the working fluid includes a gaseous portion of the working fluid compressed by the compressor.

3. The method of claim 1, wherein the one or more gas bearings is a hybrid gas bearing, and
   the supplying of the gaseous portion of the working fluid to the one or more gas bearings of the compressor includes the hybrid gas bearing compressing the gaseous portion of the working fluid.

4. The method of claim 1, wherein
   the refrigerant circuit includes a pump, and
   the operating of the refrigerant circuit in the second mode includes:
      suctioning and compressing the liquid portion of the working fluid, and supplying the liquid portion of the working fluid compressed by the pump to the one or more gas bearings of the compressor.

5. The method of claim 1, wherein the operating of the refrigerant circuit in the first mode includes determining a pressure differential of the one or more gas bearings, the pressure differential being a difference between an inlet pressure of the gaseous portion of the working fluid into the one or more gas bearings and an outlet pressure of the gaseous portion exiting the one or more gas bearings.

6. The method of claim 5, further comprising:
switching the refrigerant circuit between operating in the first mode and operating in the second mode based on the pressure differential of the one or more gas bearings.

7. The method of claim 5, further comprising:
switching the refrigerant circuit to operate in a different mode than the first mode, in response to the pressure differential of the one or more gas bearings being less than a predetermined pressure minimum.

8. The method of claim 7, wherein the different mode than the first mode is the second mode.

9. The method of claim 1, further comprising:
operating the refrigerant circuit in a third mode, the third mode being a different mode than the first mode, wherein the operating of the refrigerant circuit in a third mode includes:
compressing, with the compressor, the working fluid in the refrigerant circuit,
supplying a compressed gaseous portion of the working fluid from an auxiliary gas supply to the one or more gas bearings, the compressed gaseous portion of the working fluid from the auxiliary gas supply being at least one of stored and generated in the auxiliary gas supply, and
supporting, with the one or more gas bearings, the driveshaft of the compressor using the compressed gaseous portion of the working fluid supplied from the auxiliary gas supply.

10. A method of operating a refrigerant circuit, the refrigerant circuit including a compressor having a driveshaft and one or more gas bearings to support the driveshaft, the method comprising:
operating the refrigerant circuit in a first mode, which includes:
compressing, with the compressor, a working fluid in the refrigerant circuit, which includes preventing the compressor from operating above a gas maximum speed limit,
supplying a gaseous portion of the working fluid to the one or more gas bearings of the compressor, and
supporting, with the one or more gas bearings, the driveshaft of the compressor using the gaseous portion of the working fluid; and
operating the refrigerant circuit in a second mode, which includes:
compressing, with the compressor, the working fluid, which includes preventing the compressor from operating above a liquid maximum speed limit, the liquid maximum speed limit being less than the gas maximum speed limit,
supplying a liquid portion of the working fluid in the refrigerant circuit to the one or more gas bearings of the compressor, and
supporting, with the one or more gas bearings, the driveshaft of the compressor using the liquid portion of the working fluid.

11. A refrigerant circuit in an HVACR system, comprising:
a compressor including a driveshaft, a compression mechanism coupled to the driveshaft, a motor to rotate the driveshaft causing the compression mechanism to compress a working fluid in the refrigerant circuit, and one or more gas bearings to support the driveshaft while the driveshaft rotates;
a condenser to cool the working fluid compressed by the compressor;
an expander to expand the working fluid;
an evaporator to heat the working fluid with a process fluid;
a main flow path traveling through the compressor, the condenser, the expander, and the evaporator, and back to the compressor;
a pump fluidly connected to the one or more gas bearings of the compressor; and
a controller configured to selectively operate the refrigerant circuit in at least a first mode and a second mode,
wherein operating the refrigerant circuit in the first mode includes:
supplying a gaseous portion of the working fluid to the one or more gas bearings of the compressor, and
supporting, with the gas bearing, the driveshaft of the compressor using the gaseous portion of the working fluid, and wherein operating the refrigerant circuit in the second mode includes:
supplying, with the pump, a liquid portion of the working fluid to the one or more gas bearings of the compressor, the liquid portion of the working fluid being substantially liquid, and
supporting, with the one or more gas bearings, the driveshaft of the compressor using the liquid portion of the working fluid.

12. The refrigerant circuit of claim 11, wherein the operating of the refrigerant circuit in the second mode includes:
the pump suctioning and compressing the liquid portion of the working fluid, and supplying the liquid portion of the working fluid compressed by the pump to the one or more gas bearings of the compressor.

13. The refrigerant circuit of claim 11, wherein
the controller is configured to prevent the compressor from operating above a gas maximum speed limit in the first mode and from operating above a liquid maximum speed limit in the second mode, and
the liquid maximum speed limit is less than the gas maximum speed limit.

14. The refrigerant circuit of claim 11, wherein the pump is configured to supply the liquid portion of the working fluid to the one or more gas bearings in the second mode at a higher pressure than the gaseous portion of the working fluid supplied to the one or more gas bearings in the first mode.

15. The refrigerant circuit of claim 11, wherein the controller is configured to determine a pressure differential of the one or more gas bearings in the first mode, the pressure differential being a difference between an inlet pressure of the gaseous portion of the working fluid into the one or more gas bearings and an outlet pressure of the gaseous portion exiting the one or more gas bearings.

16. The refrigerant circuit of claim 15, further comprising:
a first sensor for detecting the inlet pressure of the gaseous portion of the working fluid into the one or more gas bearings, and a second sensor to detect the outlet pressure of the gaseous portion exiting the one or more gas bearings, wherein the controller is configured to determine the pressure differential of the bearing based on the inlet pressure detected via the first sensor and the outlet pressure detected via the second sensor.

17. The refrigerant circuit of claim 15, wherein the controller is configured to switch the refrigerant circuit between operating in the first mode and operating in the second mode based on the pressure differential of the one or more gas bearings.

18. The refrigerant circuit of claim 15, wherein the controller is configured to switch the refrigerant circuit to operate in a different mode than the first mode in response to the pressure differential of the one or more gas bearings being less than a predetermined pressure minimum.

19. The refrigerant circuit of claim 18, wherein the different mode than the first mode is the second mode.

20. The refrigerant circuit of claim 11, further comprising:
an auxiliary gas supply, wherein the controller is configured to selectively operate the refrigerant circuit in at least the first mode, the second mode, and a third mode, wherein the operating of the refrigerant circuit in a third mode includes:
supplying a compressed gaseous portion of the working fluid from the auxiliary gas supply to the one or more gas bearings, the compressed gaseous portion of the working fluid from the auxiliary gas supply being at least one of stored and generated in the auxiliary gas supply, and
supporting, with the one or more gas bearings, the driveshaft of the compressor using the compressed gaseous portion of the working fluid supplied from the auxiliary gas supply.

* * * * *